US012598081B2

(12) United States Patent
Naruboina et al.

(10) Patent No.: US 12,598,081 B2
(45) Date of Patent: Apr. 7, 2026

(54) DATA PROCESSING SYSTEM PERIPHERAL DEVICE MANAGEMENT USING COMPONENT CERTIFICATES

(71) Applicant: Dell Products L.P., Round Rock, TX (US)

(72) Inventors: Guru Prasad Yadav Naruboina, Bangalore (IN); Kalyani Korubilli, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 18/785,397

(22) Filed: Jul. 26, 2024

(65) Prior Publication Data

US 2026/0032004 A1      Jan. 29, 2026

(51) Int. Cl.
*H04L 9/32*          (2006.01)
*G06F 11/30*        (2006.01)

(52) U.S. Cl.
CPC ........ *H04L 9/3263* (2013.01); *G06F 11/3051* (2013.01)

(58) Field of Classification Search
CPC ........................... G06F 11/3051; H04L 9/3263
See application file for complete search history.

(56) References Cited

U.S. PATENT DOCUMENTS 5,339,404 A      8/1994 Vandling, III
5,740,429 A  *  4/1998 Wang .................... G06Q 10/06

| | | | |
|---|---|---|---|
| 7,418,545 B2 * | 8/2008 | Marushak | G06F 3/0683 |
| | | | 710/33 |
| 7,865,775 B2 | 1/2011 | Yao | |
| 7,974,286 B2 | 7/2011 | Keohane et al. | |
| 10,416,988 B1 | 9/2019 | Kulchytskyy | |
| 2002/0095611 A1 | 7/2002 | Jochiong | |
| 2003/0182577 A1 * | 9/2003 | Mocek | G06F 21/51 |
| | | | 713/175 |
| 2008/0059720 A1 | 3/2008 | Rothman | |
| 2009/0132838 A1 | 5/2009 | Cherian | |

(Continued)

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).

(Continued)

*Primary Examiner* — Theodore C Parsons
(74) *Attorney, Agent, or Firm* — WOMBLE BOND DICKINSON (US) LLP

(57)          ABSTRACT

Methods and systems for managing a data processing system are disclosed. Digital certificates may be used by a management controller of a data processing system to enable and/or disable one or more functions of peripheral devices hosted by the data processing system. The functions may include a Reliability, Availability, and Serviceability (RAS) reporting function of the peripheral devices. The management controller may be a microcontroller installed within the data processing system that operates independently of a central processing unit (CPU) of the data processing system. A data processing system manager of the data processing system may authenticate and sign the digital certificates.

20 Claims, 7 Drawing Sheets

(56) References Cited

U.S. PATENT DOCUMENTS

| | | | |
|---|---|---|---|
| 2011/0119686 A1* | 5/2011 | Chen | G06F 3/0607 |
| | | | 719/326 |
| 2014/0195684 A1 | 7/2014 | Taaghol | |
| 2014/0258526 A1* | 9/2014 | Le Sant | H04L 67/10 |
| | | | 709/224 |
| 2015/0287273 A1 | 10/2015 | Panzarella | |
| 2015/0304343 A1* | 10/2015 | Cabrera | G06F 21/50 |
| | | | 726/23 |
| 2015/0309559 A1 | 10/2015 | Jacobson | |
| 2018/0011524 A1 | 1/2018 | Stumpf | |
| 2020/0044868 A1* | 2/2020 | Vakulenko | G06F 21/305 |
| 2020/0097379 A1 | 3/2020 | Truong | |
| 2020/0218527 A1 | 7/2020 | Ganesan | |
| 2020/0257517 A1 | 8/2020 | Seater | |
| 2021/0042062 A1 | 2/2021 | Betusno | |
| 2023/0008238 A1 | 1/2023 | Mugunda | |
| 2023/0315485 A1 | 10/2023 | Paulraj | |
| 2023/0376575 A1 | 11/2023 | Anzai | |
| 2024/0054039 A1* | 2/2024 | Srinivasan | G06F 11/3024 |

OTHER PUBLICATIONS

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).
Rostami, Mohamadreza, et al. "Beyond random inputs: A novel ml-based hardware fuzzing." 2024 Design, Automation & Test in Europe Conference & Exhibition. IEEE. (2024) (6 Pages).
Gaikwad, Pravin, et al. "Third-party hardware IP assurance against Trojans through supervised learning and post-processing." arXiv preprint arXiv:2111.14956. IEEE. (2021) (13 Pages).

* cited by examiner

DATA PROCESSING SYSTEM PERIPHERAL DEVICE MANAGEMENT USING COMPONENT CERTIFICATES

FIELD

Embodiments disclosed herein relate generally to data processing system management. More particularly, embodiments disclosed herein relate to systems and methods to manage one or more peripheral devices installed within a data processing system.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

Figure 4:
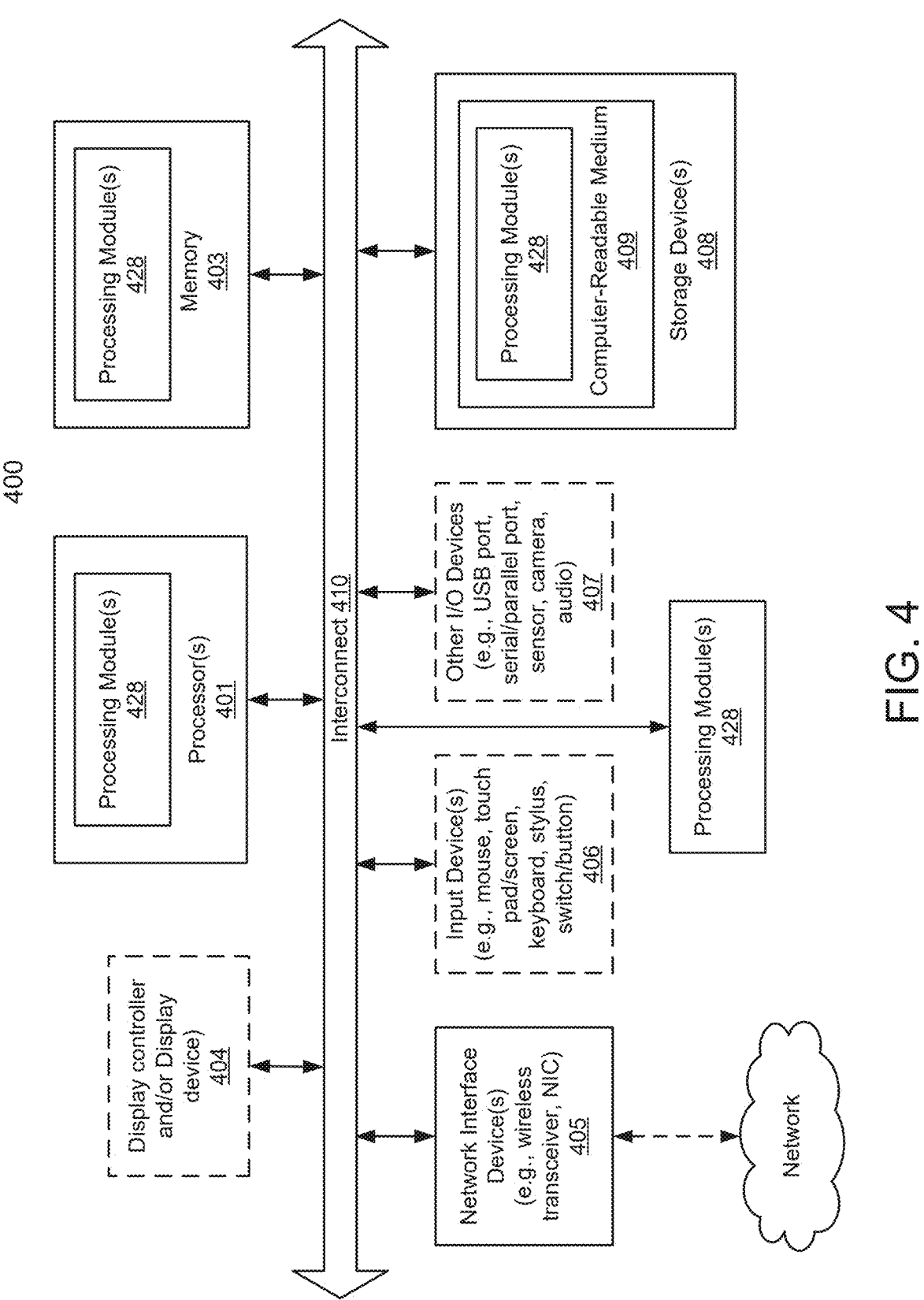
FIG. 4 shows a block diagram illustrating a computing device in accordance with one or more embodiments.

In general, embodiments disclosed herein relate to methods and systems for managing one or more peripheral devices installed within a data processing system (such as computing devices, as described below in reference to FIG. 4). Peripheral devices may include add-on and/or expansion components (namely, hardware components) such as channel cards (e.g., a fiber channel card, or the like), network interface cards (NICs), graphical processing units (GPU), data processing units (DPUs), digital signal processors (DSPs), or the like.

Reliability, Availability, and Serviceability (RAS) based events (also referred to herein as "RAS event") provide users of the data processing system with useful information (e.g., RAS related information and metrics) with regards to the components (namely, hardware components) installed within the data processing system, including information about the installed peripheral devices. In particular, RAS based events are able to provide users with real-time performance and metrics data of the one or more peripheral devices installed within the data processing system, which is extremely beneficial for the users when the data processing systems are placed to operate in different run-time environments (e.g., different random area network (RAN) environments, or the like).

However, RAS based events (e.g., for collecting RAS related information and metrics for one or more components) creates a burdensome overhead on a data processing system's central processing units (CPU's). Said another way, RAS based events take up a large quantity of the CPU's limited computing resources (e.g., processing resources) that otherwise could be used for other processes. Consumption of large amounts of the CPU's limited computing resources can also cause disruptions to and/or failure of other functions and performances of the data processing system. As such, RAS based events for peripheral devices are usually only configured to be performed (e.g., executed) only after a peripheral device has experienced a set of corrected and/or incorrect errors (e.g., only after one or more error events have occurred for the peripheral device).

Figure 1A:
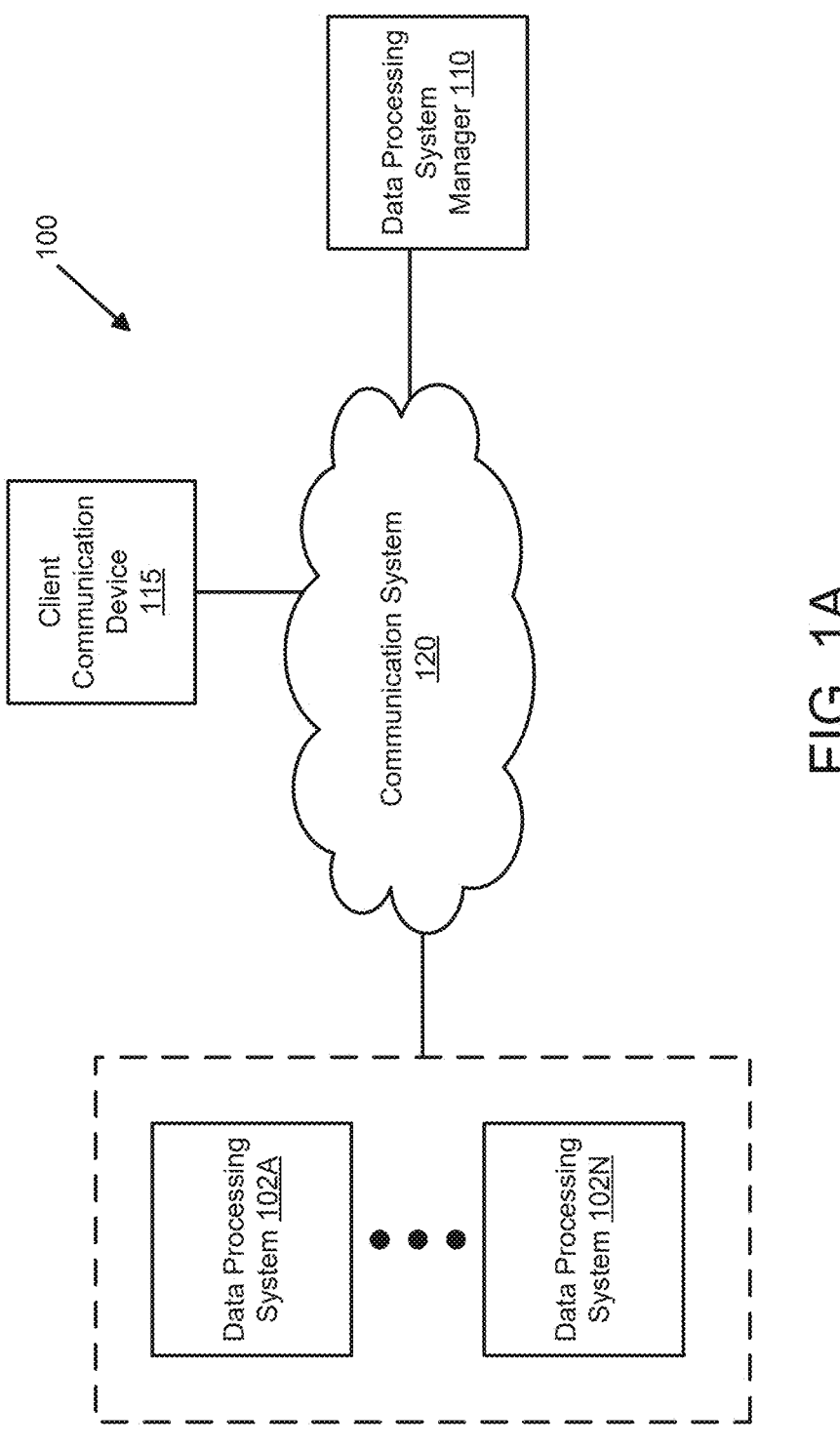
FIG. 1A shows a block diagram illustrating a system in accordance with one or more embodiments.
Figure 1B:
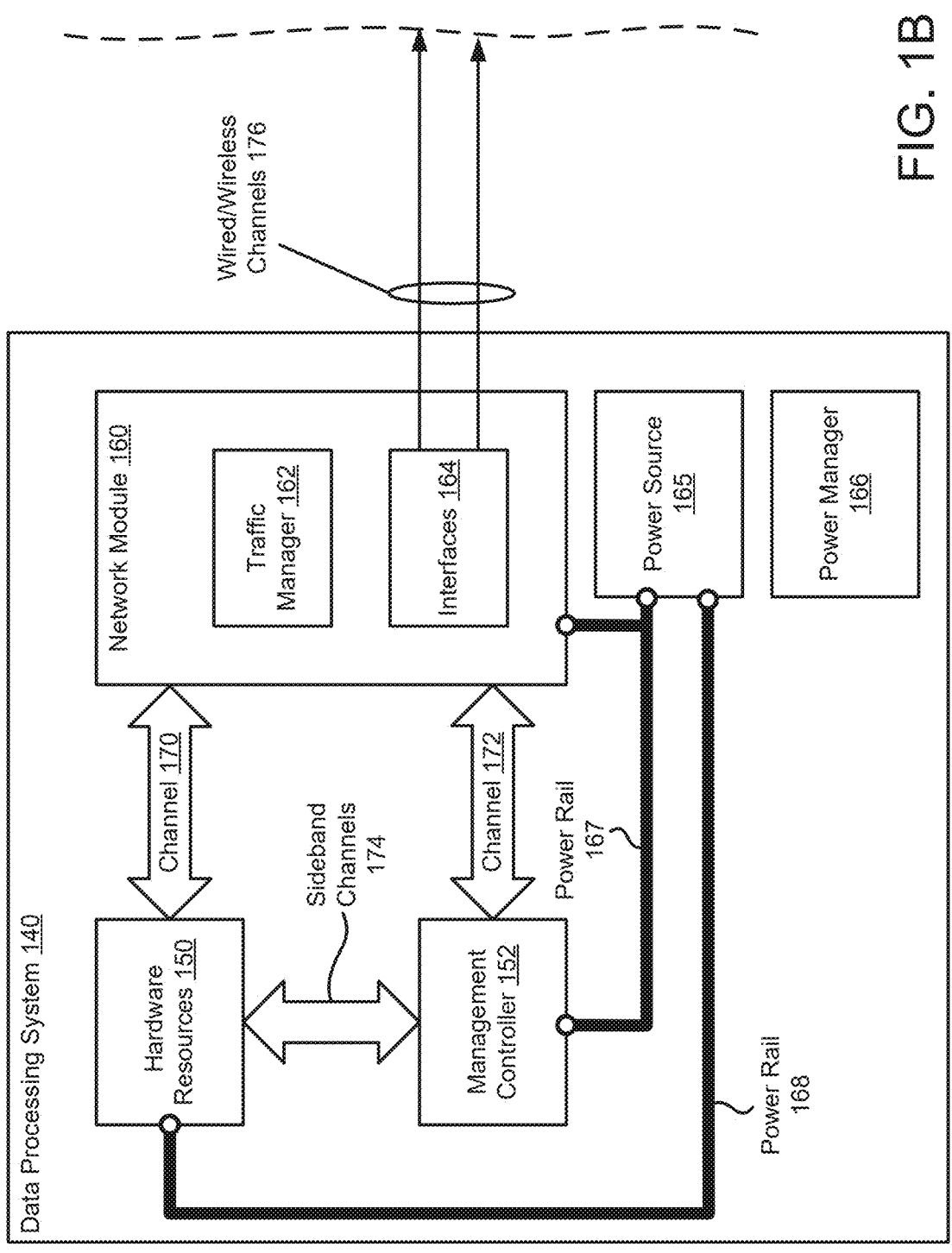
FIG. 1B shows a block diagram illustrating a data processing system in accordance with one or more embodiments.
Figure 1C:
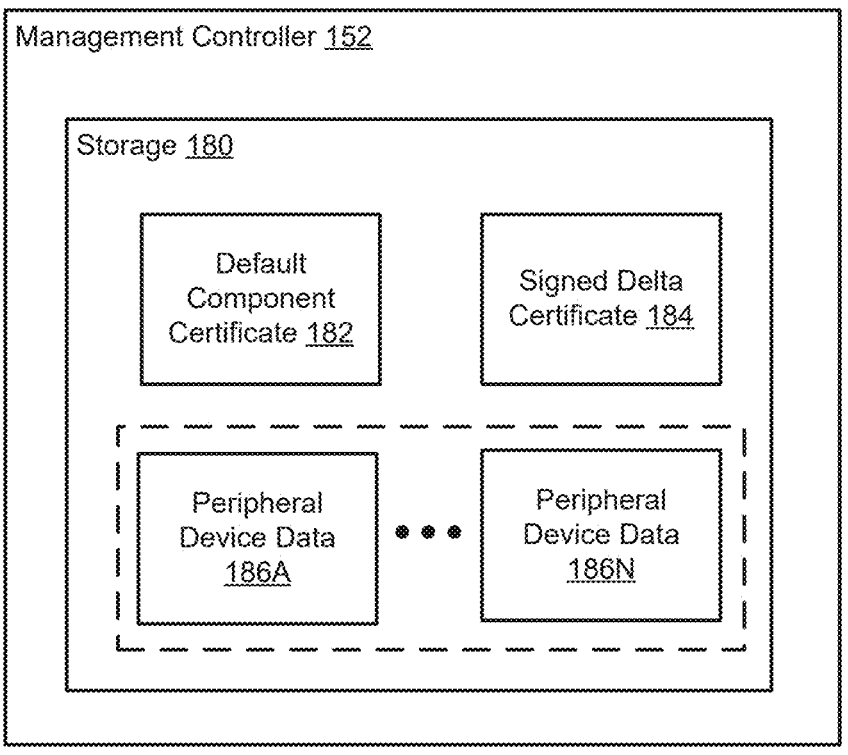
FIG. 1C shows a block diagram illustrating a management controller in accordance with one or more embodiments.

To resolve the above issues regarding RAS based events causing disruptions to and/or failure of other functions and performances of the data processing system and regarding RAS based events for peripheral devices being limited to only after error events of the peripheral device, a management controller (e.g., a baseboard management controller (BMC) in the form of a microcontroller, or the like as discussed in more detail before in reference to FIGS. 1B and 1C), may be provided manage the RAS based events for these peripheral devices. The management controller may also be installed within the data processing system but use its own limited computing resources that are separate and independent of the limited computing resources of the data processing system's CPU.

Additionally, using one or more certificates (e.g., component certificates or the like) a peripheral device's RAS features (e.g., features that allow the peripheral device to be analyzed during RAS based events) may be disabled by default when the data processing system leaves a manufacturer's site (e.g., the manufacturer's factory, warehouse, or the like). The initially disabled RAS features may then be enabled (and subsequently disabled) by the user (e.g., once the user receives the data processing system) through the management controller, again using the one or more certificates, whenever the user wishes to execute RAS events for the peripheral device, even outside of any error events occurring for the peripheral device.

Additional details regarding the default disablement of a peripheral device's RAS features as well as how the RAS features can be subsequently enabled and/or disabled at will by the user of the data processing system in accordance with one or more embodiments disclosed herein will be discussed below in reference to FIGS. 1A-3B.

Thus, embodiments disclosed herein may provide, among others an improvement (e.g., a technical improvement) to the above-discussed issues regarding RAS based events causing disruptions to and/or failure of other functions and performances of the data processing system and regarding RAS based events for peripheral devices being limited to only after error events of the peripheral device.

In particular, by using the limited computing resources of the management controller, the limited computing resources of the processing system's CPU may be saved for other processes while RAS based events can still be processed based on a user's needs and/or desire (namely, at any time a user wishes to identify and/or analyze performance of one or more peripheral devices installed within a data processing system). This directly prevents disruptions to and/or failure of the functions and performances of the data processing system, which results in embodiments disclosed herein directly improving the functionality (e.g., the computer functionalities) of these data processing systems.

Such improvements to the computer functionalities of the data processing system (including the management controller hosted (e.g., installed) within the data processing system) may also be provided through the use of the one or more certificates for versatile real-time enablement and disablement of a peripheral device's RAS features outside of the typically preprogramed limited initiation of the RAS features during error events of the peripheral device.

In an embodiment, a method for managing a data processing system is provided. The method may include: obtaining, by a management controller of the data processing system, a signed delta certificate from a data processing system manager, the signed delta certificate specifying a peripheral device of the data processing system; and activating, by the management controller and based on the signed delta certificate, a previously disabled function of the peripheral device, the previously disabled function being specified as disabled in a default component certificate stored within the management controller prior to the data processing system being shipped to a user.

The previously disabled function of the peripheral device is a Reliability, Availability, and Serviceability (RAS) reporting function of the peripheral device.

The method may further include: obtaining, by the management controller and after activating the previously disabled function of the peripheral device, peripheral device RAS data from the peripheral device; and storing, by the management controller, the peripheral device RAS data in a storage of the management controller.

The management controller is a microcontroller installed within the data processing system that operates independently of a central processing unit (CPU) of the data processing system.

The default component certificate and the signed delta certificate are stored in the storage of the management controller, the storage of the management controller being separate and independent from a main storage of the data processing system.

The signed delta certificate is obtained in response to the user providing a peripheral device configuration request to the data processing system manager, the user being an authorized user for configuring functions of the peripheral device.

The signed delta certificate is obtained by the management controller while hardware resources of the data processing system are in a powered off state, the hardware resources comprising a processor of the data processing system.

A non-transitory media may include instructions that when executed by a processor cause the computer-implemented method to be performed.

A data processing system may include the non-transitory media and a processor, and may perform the computer-implemented method when the processor executes the instructions in the non-transitory media.

Turning to FIG. 1A, a block diagram illustrating a system 100 in accordance with an embodiment is shown. The system 100 shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 102A-102N. Data processing systems 102A-102N may provide the computer implemented services to users of data processing systems 102A-102N and/or to other devices (not shown). Different data processing systems 102A-102N may provide similar and/or different computer implemented services.

To provide the computer implemented services, data processing systems 102A-102N may include various hardware components (e.g., processors, memory modules, storage devices, peripheral devices, etc.) and host various software components (e.g., operating systems, application, startup managers such as basic input-output systems, etc.). These hardware and software components (discussed in more detail below in FIGS. 1B-1C) may provide the computer implemented services via their operation.

The software components may be implemented using various types of services. For example, each data processing system of the data processing systems 102A-102N may host various services that provide the computer implemented service (e.g., application services) and/or that manage the operation of these services (e.g., management services). The aggregate (e.g., combination) of the management and application services may be a complete service that provide desired functionalities.

To manage the data processing systems 102A-102N, the system of FIG. 1A may include data processing system manager 110. Data processing system manager 110 may include various hardware components (e.g., processors, memory modules, storage devices, peripheral devices, etc.) and host various software components (e.g., operating systems, application, startup managers such as basic input-output systems, etc.). These hardware and software components may provide the functionalities (e.g., the communication with and management of the data processing systems) of the data processing system manager 110.

In one example, the data processing system manager 110 may be a computing device (e.g., computing device of FIG. 4) such as a desktop computer or server that is used by used by manufacturers (or distributors, administrators, etc.) of one or more components installed within the data processing systems 102A-102N to communicate with and manage (namely, the components installed within) the data processing systems 102A-102N.

The system of FIG. 1A may also include a client communication device 115. The client communication device 115 may be any type of computing device (e.g., computing device of FIG. 4) owned by a user of any of the data processing systems 102A-102N. More specifically, the client communication device 115 may be a computing device used by a user of a data processing system (e.g., data processing system 102A) to communicate with the data processing system manager 110 whenever the user wishes to configure (e.g., manage, make a change to, or the like) the data processing system 102A (or any of the other data processing systems). For example, the client communication device 115 may be the user's work laptop or desktop computer, a tablet computer, a smartphone, or even any of the data processing systems 102A-102N (e.g., the client communication device 115 may be the data processing system 102A itself that the user wishes to configure and/or manage).

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Turning to FIG. 1B, a diagram illustrating data processing system 140 in accordance with an embodiment is shown. Data processing system 140 may be similar to any of the data processing systems (e.g., any one of data processing systems 102A-102N) shown in FIG. 1A.

To provide computer implemented services, data processing system 140 may include any quantity of hardware resources 150. Hardware resources 150 may be in-band hardware components, and may include a processor operably coupled to memory, storage, and/or other hardware components. These hardware resources 150 (in addition to network module 160, management controller 152, power source 165, power manager 166, and the other components shown in FIG. 1B) may be the default hardware components that are included in the data processing system 140 by a manufacturer of the data processing systems 140. However, it could be appreciated that the default hardware components may include more (or less) of what is shown in FIG. 1B.

The processor (e.g., a central processing unit (CPU) installed on a motherboard, or the like) may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

In embodiments, the processor (of the hardware resources 150) may be a main processor of the data processing system 140. The processor (of the hardware resources 150), may also be the main processor on which an operating system (OS) of the data processing system 140 is stored and runs.

In embodiments, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a data processing system 140). For example, management controller 152 may be a baseboard management controller (BMC), or the like.

Management controller 152 may provide various management functionalities for data processing system 140. For example, management controller 152 may monitor various ongoing processes performed by the in-band component, may manage power distribution, thermal management, and/or other functions of data processing system 140. To conduct such monitoring and provide such functions, the management controller 152 may include its own processor (e.g., a second processor separate and operating independently from the main processer of the data processing system).

Additionally, management controller 152 may be operably connected to various components via sideband channels 174 (in FIG. 1B, a limited number of sideband channels are included for illustrative purposes, it will be appreciated that management controller 152 may communication with other components (including peripheral devices installed within the data processing system 140) via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Said another way, as long as the data processing system is connected to a power source (e.g., a batter, a wall outlet, a generator, or the like), management controller 152 may still be powered on and operational while the data processing system itself is in a powered off (e.g., shut down/shut off) state. More specifically, turning off the data processing system 140 (e.g., via a shut down command) does not also turn off the management controller 152. As a result, the management controller 152 may still perform processes (e.g., perform the processes, operations, steps, or the like of the data flow diagrams and flowcharts discussed below in reference to FIGS. 2-3B) even while the data processing system 140 itself is in a powered off/shut off state.

To implement the separate power domains, data processing system 140 may include a power source (e.g., 165) that separately supplies power to power rails (e.g., 167, 168) that power the respective power domains. Power from the power source (e.g., one or more power supplies, batteries, or other types of PSUs etc.) may be selectively provided to the separate power rails to selectively power the different power domains. A power manager (e.g., 166) may manage power from power source 165 that is supplied to the power rails. Management controller 152 may cooperate with power manager 166 to manage supply of power to these power domains.

In FIG. 1B, an example implementation of separate power domains using power rails 167-168 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

In addition to the components (e.g., hardware resources 150, network module 160, management controller 152, power source 165, power manager 166, power rails 167-168, components making up channels 170-172 and sideband channels 174, etc.) additional hardware components (e.g., peripheral devices) (not shown in FIG. 1B) may be installed within (or externally to) the data processing system 140.

In embodiments, these peripheral devices may include channel cards (e.g., a fiber channel card, or the like), network interface cards (NICs), graphical processing units (GPU), data processing units (DPUs), digital signal processors (DSPs), or the like and may communicate with the existing components of the data processing system 140 via various interfaces (e.g., one or more Peripheral Component Interconnect Express (PCIe) buses, universal serial buses (USB), or the like).

These peripheral devices may also draw power from the power source 165 in order to provide their functions (e.g., may be powered entirely, or in part, by power supplied from the power source 165 of the data processing system 140). Each of these peripheral devices may have one or more power rating values (e.g., a minimum, average, optimal, maximum, or the like power rating value) (also referred to herein simply as "power rating") as defined by a manufacturer and/or provider of these peripheral devices. To perform their functionalities, these peripheral devices may also use the limited computing resources of any of the main processor of the data processing system 140 and/or the processor of management controller 152.

Turning to FIG. 1C, a diagram illustrating an example of a management controller 152 of data processing system 140 in accordance with an embodiment is shown. As shown in FIG. 1C, the management controller 152 may include a storage 180 that stores a default component certificate 182, a signed delta certificate 184, and one or more peripheral device data 186A-186N (also referred to herein as "peripheral device RAS data"). Each of these components will be described as follows.

Storage 180 may be implemented using any type and combination of storage devices and/or memory (e.g., hard disk drive (HDD), solid state drive (SSD), random access memory (RAM), or the like). Storage 180 may be an independent storage of the management controller 152 (e.g., independent from the storage(s) of the data processing system 140 that are part of the hardware resources 150). Said another way, the storage(s) making up part of hardware resources 150 may be the main storage(s) of the data processing system 140 while storage 180 is a second storage that is independent and separate from the main storage(s).

The default component certificate 182 may be a digital certificate (e.g., a data file) provided at the time that the data processing system (e.g., 140 of FIG. 1B) is manufactured to ensure an accuracy of the components included within the data processing system. In particular, the default component certificate 182 may be provided to provide a supply chain assurance offering that enables users of the data processing system (e.g., a customer that received the data processing system) to verify that the received data processing system matches what was manufactured (e.g., in the manufacturer's factory).

In order to validate the components (e.g., all of the components of data processing system 140 discussed in FIG. 1B including any installed peripheral devices), the default component certificate 182 may contain unique system component identifiers (IDs) of each of these components and may be generated and signed during a factory assembly process of the data processing system. Upon being signed, the default component certificate 182 may be stored into storage 180 of the management controller 152. In embodiments, once signed, the default component certificate 182 may become immutable (e.g., unable to be edited by any entity).

To further elaborate, the default component certificate 182 may include information regarding each peripheral device installed within the data processing system. For example, assume that the data processing system 140 is provided with a NIC at the time of assembly. The default component certificate 182 may include, for the NIC, at least (among various other information), for example: (i) information indicative of a type of connection (e.g., a PCIe bus or the like) between the NIC and the hardware resources (e.g., 150, FIG. 1B) of the data processing system; (ii) a location (e.g., an interface number/ID, or the like such as "NIC.Slot. 1-1-1") of the NIC within the data processing system; (iii) a component class registry of the NIC; (iv) a component class of the NIC; (v) manufacturer details of the NIC; (vi) a model number of the NIC; (vii) a serial number of the NIC; (viii) a version number of the NIC; (ix) a RAS feature indicator (e.g., for indicating whether the RAS feature is enabled or disabled for the NIC); or the like.

In embodiments, as a default, the RAS feature indicator of all the peripheral devices will be set to "disabled", within the default component certificate 182, as the data processing system is shipped from the manufacturer site to the user (e.g., a customer). Said another way, the RAS feature is disabled for all peripheral devices when the data processing system is shipped to the user.

In embodiments, the management controller 152 may be configured to use all (or a portion) of the information included in the default component certificate 182 to manage the data processing system (and all of the individual components of the data processing system). For example, the management controller 152 may use the value (e.g., enabled or disabled) included in the RAS feature indicator for a peripheral device to enable or disable the RAS feature for that peripheral device.

The management controller 152 may also use all (or a portion) of the information included in the default component certificate 182 to determine whether any components have changed (e.g., been replaced by a user of the data processing system, or by an unknown third party or the like). Said another way, the management controller 152 may use all (or a portion) of the information included in the default component certificate 182 to determine whether the data processing system has been tampered with.

Similar to the default component certificate 182, signed delta certificate 184 may also be a digital certificate (e.g., a data file). Signed delta certificate 184 may be an amended copy of the default component certificate 182 including changes to all (or a portion) of the original information included in the default component certificate 182. For example, assume that a user wishes to enable RAS features for a peripheral device installed in the data processing system, a signed delta certificate 184 showing the RAS feature indicator changed to "enabled" for that particular peripheral device may be generated and signed by a manufacturer and/or administrator of the data processing system (e.g., using data processing system manager 110 of FIG. 1A).

Similar to default component certificate 182, once signed (e.g., by the data system processing manager 110 of FIG. 1A), the signed delta certificate 184 also become immutable.

In embodiments, once received, the signed delta certificate 184 replaces the default component certificate 182 (e.g., takes precedence/is given a higher priority over, or the like) the default component certificate 182. Any number of signed delta certificates 184 may be received after the data processing system leaves a manufacturer's site. The most recently received one of the signed delta certificates 184 will take precedence (e.g., will be used by the management controller 152) over all of the other received signed delta certificates 184 and the original default component certificate 182. Said another way, the information contained in the most recently received (e.g., the newest/latest one) of the signed delta certificates 184 will dictate how the management controller 152 manages (namely the components) of the data processing system.

In embodiments, the default component certificate 182 and the signed delta certificate 184 may be signed (e.g., by the manufacturer and/or managing entity of the data processing system) using any signing (e.g., cryptographic or non-cryptographic) technique/method without departing from the scope of embodiments disclosed herein.

The default component certificate 182 and the signed delta certificate 184 may also be (upon first receipt or before being used) encrypted using any type of encryption technique or method without departing from the scope of embodiments disclosed herein.

Peripheral device data 186A-186N may be any type of RAS based data for any of the peripheral devices installed within the data processing system. The RAS based data may be obtained by the management controller 152 directly from the peripheral device(s), may be reported to the management controller 152 by the peripheral devices(s), etc. Once received, the management controller 152 may store the peripheral device data 186A-186N in the storage 180 while simultaneously (or subsequently) providing the peripheral device data 186A-186N to a user of the data processing system (e.g., via displaying the data on a display of the data processing system, in a file (e.g., a log file or the like) created to store the data, or the like).

Although not shown in FIG. 1C, management controller 152 may also include other components such as its own set of hardware components (e.g., the second processor, one or more second memories that are independent and separate from the main memor(ies) of the data processing system 140, or the like) and its own set of software components (e.g., a set of applications independent and separate from the applications running on the other components of the data processing system 140 of FIG. 1B).

Figure 2:
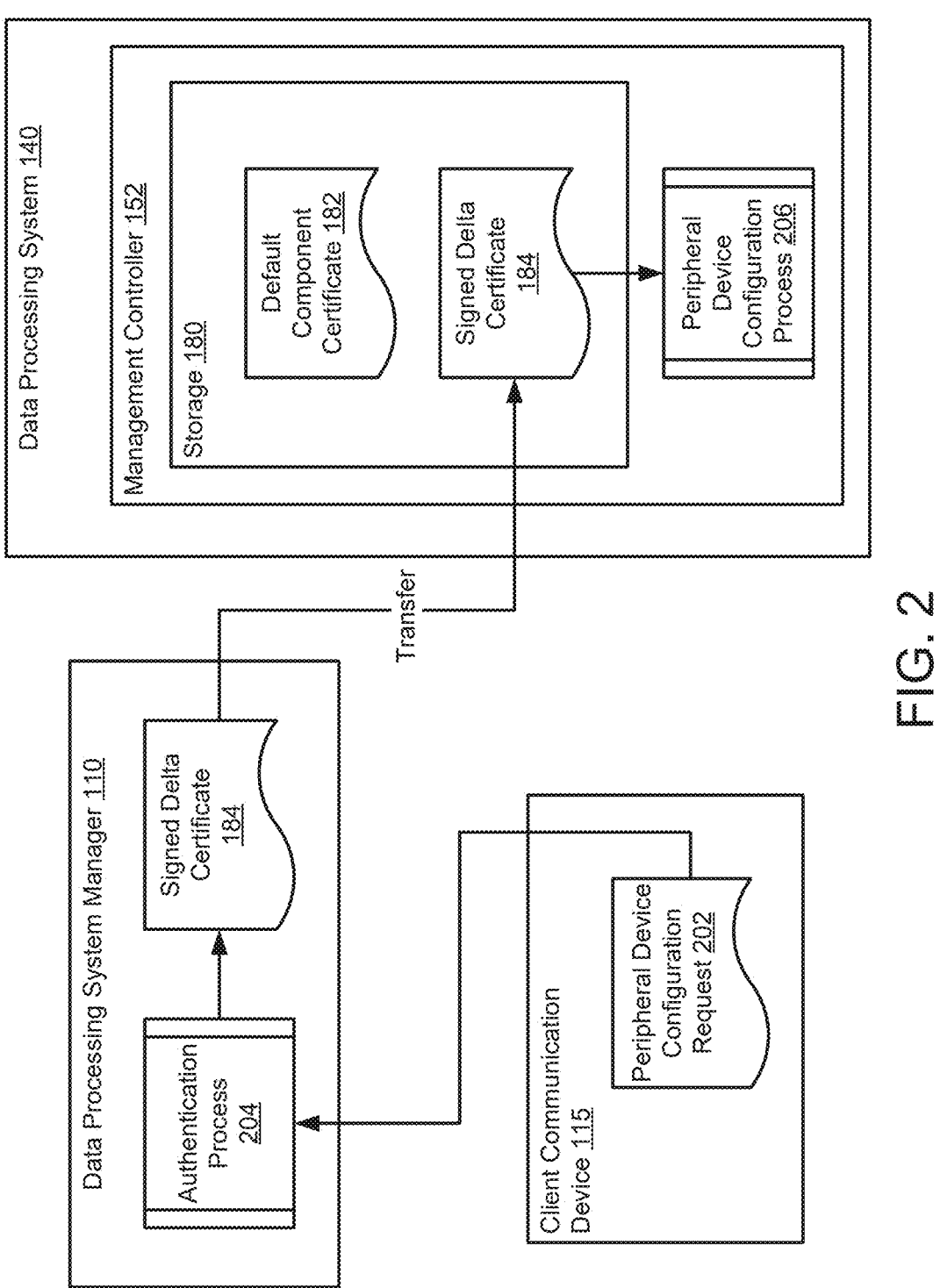
FIG. 2 shows a data flow diagram in accordance with one or more embodiments.

To further clarify embodiments disclosed herein, a data flow diagram in accordance with one or more embodiments disclosed herein is shown in FIG. 2. In this diagram, flows of data and processing of data are illustrated using different sets of shapes. A first set of shapes (e.g., 202, 182, 184, etc.) is used to represent data structures (e.g., files, data packets, or the like), a second set of shapes (e.g., 204, 206, etc.) is used to represent processes performed using and/or that generate data, and a third set of shapes (e.g., 115, 110, 140, 152, 180, etc.) is used to represent the components (e.g., devices) that perform the processes shown using the second set of shapes.

The data flow diagram in FIG. 2 shows a peripheral device configuration process in accordance with one or more embodiments. Although the data flow diagram in FIG. 2 will be described specifically with regard to a peripheral device RAS enablement scenario, the data flow diagram in FIG. 2 is not limited to only this process. Namely, the process discussed in the data flow diagram in FIG. 2 can be used to configure (e.g., using management controller 152) any feature (e.g., functionality and/or capability) of any component installed within (or externally to) a data processing system (e.g., any of 102A-102N of FIG. 1A and/or 140 of FIG. 1B) at any time during an operating life (e.g., deployment life, use life, or the like) of the data processing system.

As shown in FIG. 2, a client communication device 115 may be used (e.g., by a user of a data processing system 140) to generate a peripheral device configuration request 202. As discussed above in reference to FIG. 1A, the client communication device 115 may be the data processing system 140 itself.

In embodiments, in this example scenario, the peripheral device configuration request 202 may include, among various other data/information: (i) a request for enabling (e.g., turning on) a RAS feature of a peripheral device installed within the data processing system 140; (ii) any type of information (e.g., an ID including a name or model number or the like, an installation location, or the like) usable to identify the peripheral device to be configured; (iii) any type of information usable to verify a user that transmitted the peripheral device configuration request 202 (e.g., a name, badge number, employee code, or the like of the user; a single sign on information of the user; or the like); or the like.

The client communication device 115 may provide the peripheral device configuration request 202 to the data processing system manager 110. Upon receiving the peripheral device configuration request 202 the data processing system manager 110 may perform an authentication process 204 (e.g., using the information included in the peripheral device configuration request 202) to determine (e.g., verify, validate, or the like) whether the user that generated the peripheral device configuration request 202 has the privilege (e.g., authority) to configure the peripheral device (and/or the data processing system as a whole).

For example, the data processing system manager 110 may verify whether the peripheral device configuration request 202 is generated by the actual owner of the data processing system 140. As another example, the data processing system manager 110 may verify a level of authority of the user that generated the peripheral device configuration request 202 to determine whether the user is at a level of authority that can make configuration changes to the peripheral device (and/or the data processing system as a whole).

Any other method, type of information, and criterion (or criteria) may be used to determine whether the user that generated the peripheral device configuration request 202 has the privilege (e.g., authority) to configure the peripheral device (and/or the data processing system as a whole) without departing from the scope of embodiments disclosed herein.

Once the data processing system manager 110 has confirmed that the peripheral device configuration request 202 may be implemented to the data processing system 140, the data processing system manager 110 may generate a signed delta certificate 184 containing the configuration changes to be applied to the peripheral device. Namely, in this example scenario, a signed delta certificate 184 where the RAS feature indicator of the peripheral device is changed from "disabled" to "enabled". In embodiments, upon generation, the signed delta certificate 184 may also be signed by the data processing system manager 110.

In one or more embodiments, instead of the data processing system manager 110 generating the signed delta certificate 184, the client communication device 115 may be configured to generate an unsigned version of the signed delta certificate 184 (e.g., based on input commands received from a user). In such an example, the client communication device 115 may provide (e.g., transmit) the unsigned version of the signed delta certificate 184 to the data processing system manager 110 where the data processing system manager 110 will then sign the unsigned version of the signed delta certificate 184 upon completing authentication process 204 to determine whether the user that generated the unsigned version of the signed delta certificate 184 has the privilege to generate the unsigned version of the signed delta certificate 184 (and/or has the privilege to configure the peripheral device (and/or the data processing system as a whole)).

In embodiments, the peripheral device configuration request 202 and/or the unsigned version of the signed delta certificate 184 may be generated on the client communication device 115 through a user accessing a graphical user interface (GUI) (e.g., via a web browser, a desktop application, or the like) that allows the user to access one or more features provided by the manufacturer of the data processing system 140 (e.g., a user submitting a peripheral device configuration request through the manufacturer's website or application, or the like).

Once the data processing system manager 110 has signed the signed delta certificate 184, the data processing system manager provides (e.g., transmits, uploads, or the like) the signed delta certificate 184 to the management controller 152 of data processing system 140 where the signed delta certificate 184 will be stored in storage 180 of the management controller.

Upon receiving the signed delta certificate 184, the management controller 152 may use the signed delta certificate 184 to initiate performance of peripheral device configuration process 206 where any changes to the peripheral device specified in the signed delta certificate 184 will be implemented by the management controller 152.

For example, in the specific example scenario of FIG. 2, the management controller 152 may enable the RAS feature of the identified peripheral device, obtain peripheral device data (e.g., 184A-186N) from the peripheral device as part of the RAS featured being enabled (e.g., turned on), and provide the obtained peripheral device data to a user of the data processing system 140.

In embodiments, the obtaining of the peripheral device data as part of the RAS features of that peripheral device being enabled (e.g., turned on) may be performed (e.g., executed) solely by the management controller 152 using solely the limited computing resources of the management controller 152. Thus, the limited computing resources of the data processing system 140 (e.g., namely, the limited computing resources of the main processor(s) and storage(s) of the data processing system 140) advantageously remain untouched and/or unaffected by this turning on of the RAS features of the peripheral device.

As a result, the RAS related information for the peripheral device can be obtained at any time as desired and/or needed by the user without the user having to worry that the obtaining of the RAS related information would cause any disruptions to and/or failure of other functions and performances of the data processing system.

Any of the processes illustrated using the second set of shapes (shown in FIG. 2) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Figure 3A:
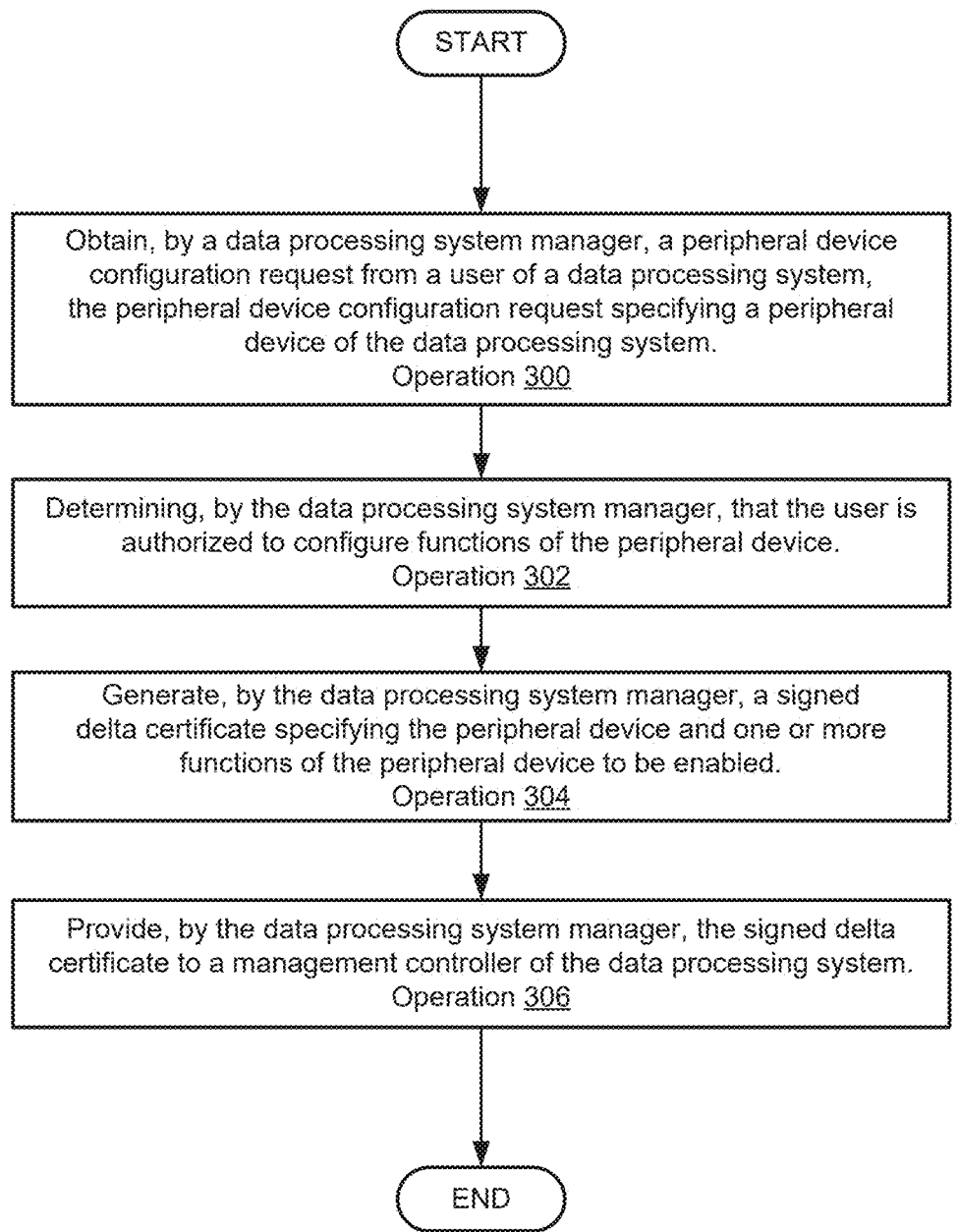
FIGS. 3A-3B show flowcharts in accordance with one or more embodiments.
Figure 3B:
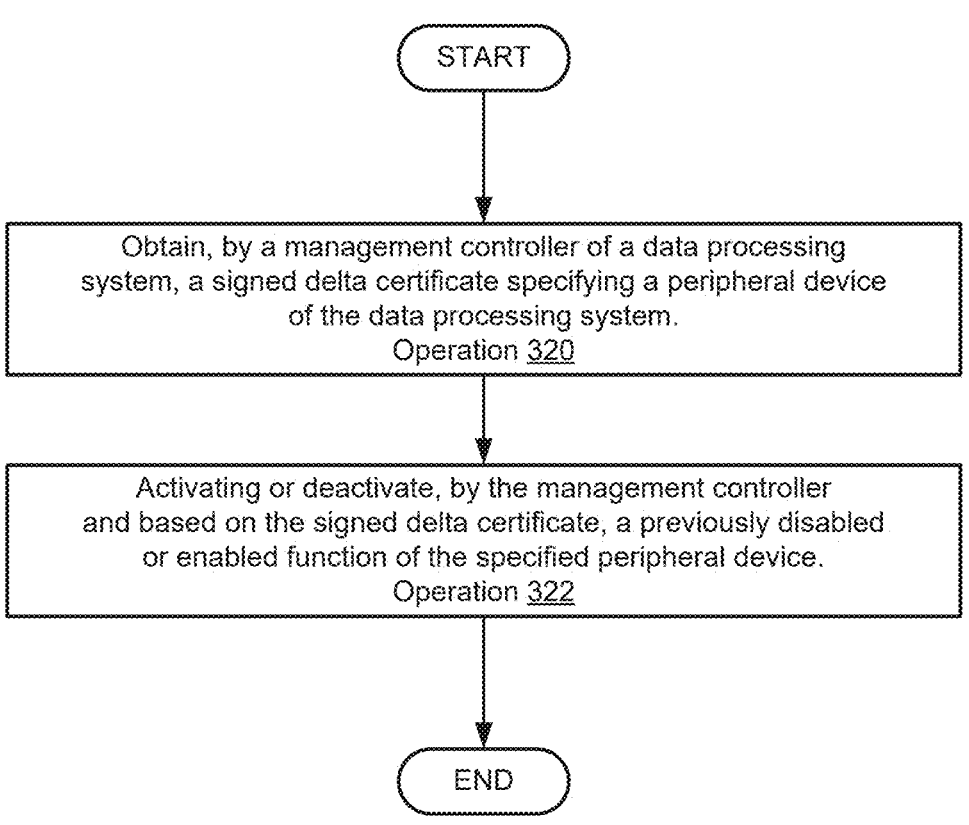

As discussed above, the components of FIGS. 1A-1C may perform various methods for managing a data processing system. FIGS. 3A-3B illustrate examples of methods that may be performed by the components of FIGS. 1A-1C. For example, any of the data processing systems 102A-102N, the data processing system manager 110, and/or the client communication device 115 shown in FIG. 1A may perform all or a portion of the methods. In the diagrams discussed below and shown in FIGS. 3A-3B, any of the operations may be repeated, performed in different orders, and/or performed in parallel with or in a partially overlapping in time manner with other operations.

Starting with FIG. 3A, in Operation 300, as discussed above in reference to FIG. 2, a data processing system manager (e.g., 110, FIGS. 1A and 2) may obtain a peripheral device configuration request from a user of a data processing system (e.g., 102A-102N and 140 of FIGS. 1A and 2, respectively). In embodiments, the peripheral device configuration request may specify a peripheral device of the data processing system.

In Operation 302, as discussed above in reference to FIG. 2, the data processing system manager may determine (e.g., as part of authentication process 204 discussed in FIG. 2), that the user is authorized to configure functions of the peripheral device.

In embodiments, in the event that the data processing system manager determines that the user is NOT authorized to configure functions of the peripheral device, the process may end at Operation 302 with the data processing system manager notifying the client communication device of the authentication failure.

In Operation 304, as discussed above in reference to FIG. 2, the data processing system manager may generate a signed delta certificate (e.g., 182, FIGS. 1C and 2) specifying the peripheral device and one or more functions (e.g., one or more previously disabled functions) of the peripheral device that is to be enabled (e.g., turned on). The signed delta certificate may also specify one or more functions (e.g., one or more previously enabled functions) of the peripheral device that is to be disabled (e.g., turned off).

In embodiments, the one or more functions may include is a Reliability, Availability, and Serviceability (RAS) reporting function (e.g., included as part of the RAS features) of the peripheral device.

In Operation 306, as discussed above in reference to FIG. 2, the data processing system manager, may provide the signed delta certificate to a management controller of the data processing system. In embodiments, the signed delta certificate may be provided to the management controller while parts of the data processing system (namely, the hardware resources 150) are in a powered off state (e.g., the signed delta certificate may be obtained by the management controller while the hardware resources 150 of the data processing system are turned off/shut off.

As discussed above in reference to FIG. 2, instead of the data processing system manager generating the signed delta certificate, the client communication device (e.g., 115, FIG. 1A) may be configured to generate an unsigned version of the signed delta certificate (e.g., based on input commands received from a user). In such an example, the client communication device may provide (e.g., transmit) the unsigned version of the signed delta certificate to the data processing system manager (e.g., as part of Operation 300 of FIG. 3A) where the data processing system manager will then sign (e.g., as part of Operation 304 of FIG. 3A) the unsigned version of the signed delta certificate upon completing the authentication process (e.g., as part of Operation 302 of FIG. 3A) to determine whether the user that generated the unsigned version of the signed delta certificate has the privilege to generate the unsigned version of the signed delta certificate (and/or has the privilege to configure the peripheral device (and/or the data processing system as a whole)).

The method of FIG. 3A may end following Operation 306.

Turning now to FIG. 3B, in Operation 320, as discussed above in reference to FIG. 2, a management controller of a data processing system may obtain (e.g., from a data processing system manager of the data processing system) a signed delta certificate specifying a peripheral device of the data processing system.

In embodiments, the signed delta certificate may also specify a previously disabled and/or enabled function of the specified peripheral device that is now to be enabled and/or disabled, respectively.

In Operation 322, as discussed above in reference to FIG. 2 (namely as part of peripheral device configuration process 206 of FIG. 2), the management controller may active or deactivate (e.g., enable or disable, respectively) a previously disabled or enabled function of the specified peripheral device (e.g., based on the information included in the signed delta certificate).

In embodiments, the management controller may activate (e.g., using the signed delta certificate) a previously disabled function of the peripheral device where the previously disabled function is specified as disabled in a default peripheral component certificate (e.g., 182, FIG. 1C) stored within the management controller prior to the data processing system being shipped to a user.

In embodiments, the signed delta certificate may also be stored into a storage (e.g., 180, FIG. 1C) of the management controller to replace an existing default component certificate 182 and any existing previously obtained ones (e.g., instances) of the signed delta certificate.

The method of FIG. 3B may end following Operation 322.

Any of the components illustrated in FIGS. 1A-3B may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:
    obtaining, by a management controller of the data processing system, a signed delta certificate from a data processing system manager, the signed delta certificate specifying a peripheral device of the data processing system, wherein the signed delta certificate is obtained by the management controller while hardware resources of the data processing system are in a powered off state, and the hardware resources comprise a first processor of the data processing system that is separate from a second processor of the management controller; and
    activating, by the management controller and based on the signed delta certificate, a previously disabled function of the peripheral device, the previously disabled function being specified as disabled in a default component certificate stored within the management controller prior to the data processing system being shipped to a user.

2. The method of claim 1, wherein the previously disabled function of the peripheral device is a Reliability, Availability, and Serviceability (RAS) reporting function of the peripheral device.

3. The method of claim 2, further comprising:
    obtaining, by the management controller and after activating the previously disabled function of the peripheral device, peripheral device RAS data from the peripheral device; and
    storing, by the management controller, the peripheral device RAS data in a storage of the management controller.

4. The method of claim 3, wherein the management controller is a microcontroller that is physically installed within the data processing system.

5. The method of claim 3, wherein the default component certificate and the signed delta certificate are stored in the storage of the management controller, the storage of the management controller being separate and independent from a main storage of the data processing system.

6. The method of claim 1, wherein the signed delta certificate is obtained in response to the user providing a peripheral device configuration request to the data processing system manager, the user being an authorized user for configuring functions of the peripheral device.

7. The method of claim 1, wherein the data processing system further comprises a single network module that is shared by both of the hardware resources and the management controller and that is adapted to separately advertise endpoints used by the data processing system manager to communicate respectively with each of the management controller and the hardware resources.

8. The method of claim 7, wherein the single network module separately advertises the endpoints for the management controller and the hardware resources such that:
    first communications from the data processing system manager received via a first endpoint of the endpoints and meant for the hardware resources never flow through the management controller, and
    second communications from the data processing system manager received via a second endpoint of the endpoints and meant for the management controller never flow through the hardware resources.

9. A non-transitory machine-readable medium having instructions stored therein, which when executed by a processor, cause the processor to perform operations for managing a data processing system, the operations comprising:
    obtaining, by a management controller of the data processing system, a signed delta certificate from a data processing system manager, the signed delta certificate specifying a peripheral device of the data processing system, wherein the signed delta certificate is obtained by the management controller while hardware resources of the data processing system are in a powered off state, and the hardware resources comprise a first processor of the data processing system that is separate from a second processor of the management controller; and
    activating, by the management controller and based on the signed delta certificate, a previously disabled function of the peripheral device, the previously disabled function being specified as disabled in a default component certificate stored within the management controller prior to the data processing system being shipped to a user.

10. The non-transitory machine-readable medium of claim 9, wherein the previously disabled function of the peripheral device is a Reliability, Availability, and Serviceability (RAS) reporting function of the peripheral device.

11. The non-transitory machine-readable medium of claim 10, wherein the operations further comprise:

obtaining, by the management controller and after activating the previously disabled function of the peripheral device, peripheral device RAS data from the peripheral device; and storing, by the management controller, the peripheral device RAS data in a storage of the management controller.

12. The non-transitory machine-readable medium of claim 11, wherein the management controller is a microcontroller that is physically installed within the data processing system.

13. The non-transitory machine-readable medium of claim 11, wherein the default component certificate and the signed delta certificate are stored in the storage of the management controller, the storage of the management controller being separate and independent from a main storage of the data processing system.

14. The non-transitory machine-readable medium of claim 9, wherein the signed delta certificate is obtained in response to the user providing a peripheral device configuration request to the data processing system manager, the user being an authorized user for configuring functions of the peripheral device.

15. A data processing system, comprising:

hardware resources comprising a first processor;

a management controller comprising a second processor that is separate from the first processor, wherein data processing system stores instructions that causes the management controller to perform operations for managing the data processing system, the operations comprising:

obtaining a signed delta certificate from a data processing system manager, the signed delta certificate specifying a peripheral device of the data processing system, wherein the signed delta certificate is obtained by the management controller while the hardware resources of the data processing system are in a powered off state; and p2 activating, based on the signed delta certificate, a previously disabled function of the peripheral device, the previously disabled function being specified as disabled in a default component certificate stored within the management controller prior to the data processing system being shipped to a user.

16. The data processing system of claim 15, wherein the previously disabled function of the peripheral device is a Reliability, Availability, and Serviceability (RAS) reporting function of the peripheral device.

17. The data processing system of claim 16, wherein the operations further comprise:

obtaining, after activating the previously disabled function of the peripheral device, peripheral device RAS data from the peripheral device; and storing the peripheral device RAS data in a storage of the management controller.

18. The data processing system of claim 17, wherein the management controller is a microcontroller that is physically installed within the data processing system.

19. The data processing system of claim 17, wherein the default component certificate and the signed delta certificate are stored in the storage of the management controller, the storage of the management controller being separate and independent from a main storage of the data processing system.

20. The data processing system of claim 15, wherein the signed delta certificate is obtained in response to the user providing a peripheral device configuration request to the data processing system manager, the user being an authorized user for configuring functions of the peripheral device.

* * * * *